United States Patent [19]

Kasai et al.

[11] Patent Number: 4,710,215
[45] Date of Patent: Dec. 1, 1987

[54] PROCESS FOR DISTILLATION-CRYSTALLIZATION OF ZINC CARBONATE

[75] Inventors: Tatsushi Kasai; Tatsuo Niikura; Masanori Sato, all of Tokyo; Takao Hashimoto; Akiya Yamashita, both of Ibaraki, all of Japan

[73] Assignees: Tsukishima Kikai Co., Ltd., Tokyo; Sumitomo Metal Industries, Ltd., Osaka, both of Japan

[21] Appl. No.: 813,103

[22] Filed: Dec. 24, 1985

[30] Foreign Application Priority Data

| Dec. 28, 1984 | [JP] | Japan | 59-275231 |
| Dec. 28, 1984 | [JP] | Japan | 59-275232 |
| Dec. 28, 1984 | [JP] | Japan | 59-275233 |
| Dec. 28, 1984 | [JP] | Japan | 59-275234 |
| Dec. 28, 1984 | [JP] | Japan | 59-275236 |
| Dec. 28, 1984 | [JP] | Japan | 59-275238 |

[51] Int. Cl.$^4$ ............................................. B01D 3/08
[52] U.S. Cl. ................................ 62/532; 203/48; 423/105; 423/356; 423/420; 423/622
[58] Field of Search ............... 62/123, 532; 23/299, 23/302 A, 305 RE; 203/48; 423/105, 356, 419 R, 420, 622

[56] References Cited

U.S. PATENT DOCUMENTS

| 3,713,991 | 1/1973 | Thomas | 203/48 |
| 3,929,598 | 12/1975 | Stern et al. | 423/105 |
| 4,061,718 | 12/1977 | Verlaeten et al. | 423/356 |
| 4,140,586 | 2/1979 | Kwasnoski et al. | 423/356 |

FOREIGN PATENT DOCUMENTS 88319 5/1984 Japan .................................. 423/105

Primary Examiner—Ronald C. Capossela
Attorney, Agent, or Firm—Flynn, Thiel, Boutell & Tanis

[57] ABSTRACT

A process for distillation-crystallization of a zinc carbonate which is characterized in that a distillation column having a plurality of plates or trays is used for crystallizing basic zinc carbonate ($2ZnCO_3.3Zn(OH)_2$ or $ZnCO_3.3Zn(OH)_2H_2O$) from a solution of basic zinc ammonium carbonate ($Zn(NH_3)_4CO_3$); said solution is fed to an upper portion of the distillation column, while heating a bottom portion of the distillation column, to effect a distillation operation.

11 Claims, 11 Drawing Figures

PROCESS FOR DISTILLATION-CRYSTALLIZATION OF ZINC CARBONATE

BACKGROUND OF THE INVENTION

This invention relates to a process for crystallizing, by distillation, a basic zinc carbonate ($2ZnCO_3.3Zn(OH)_2$ or $ZnCO_3.3Zn(OH)_2.H_2O$) from a solution of a basic zinc ammonium carbonate ($Zn(NH_3)_4CO_3$).

Waste zinc is discharged from a Zn plating plant such as in a steel mill. However, zinc has various uses and is used, for example, as a pigment or a vulcanization accelerator, in the form of ZnO. Therefore, if the waste zinc is treated to remove impurities such as heavy metals introduced during a process where the waste is produced and the zinc recovered, it would be very advantageous.

By this reason, the inventors of the present invention have previously proposed, in Japanese Patent Laid-Open (Kokai) No. 59-88319, a process for recovering zinc cabonate from zinc-containing substances.

To recover zinc carbonate from the zinc-containing substances, it is preferable to dissolve the zinc-containing substances in a solution which contains at least $NH_4OH$ and $(NH_4)_2CO_3$, and then crystallize zinc carbonate from the solution. As the waste zinc materials contain heavy metals as described above, it is preferable to remove the heavy metals for recovering zinc compounds of high quality. In this case, the uses of the recovered zinc will be increased.

The inventors found, after an intensive and extensive study, that it is optimum to use a procedure comprising dissolution→ion exchange→crystallization to remove the impurities as much as possible. This process includes the following reactions:

Dissolution Step

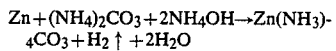
$4CO_3 + H_2 \uparrow + 2H_2O$     (1)

Ion Exchange Step

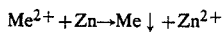     (2)

Crystallization Step

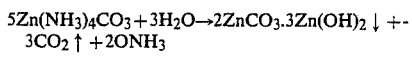
$3CO_2 \uparrow + 2ONH_3$     (3A)

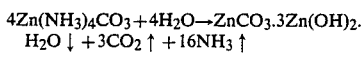
$H_2O \downarrow + 3CO_2 \uparrow + 16NH_3 \uparrow$     (3B)

In the step of crystallization, 80 to 90% of the crystallization is effected by reaction 3B. Little crystallization occurs in reaction 3A.

To carry out the crystallization step, it is common in the field to employ one or more crystallizers.

When the crystallization step is carried out by the crystallizers according to the conventional technique, it is preferred to operate the crystallizers like a multiple effect evaporator. For example, steam is fed into a first effect and the resultant vapor is sequentially introduced into the succeeding effects to evaporate and distill ammonium. In general, a considerable number of crystallizers and a considerable amount of steam are needed to lower the ammonium content to, for example, 1000 ppm or less. Besides, the operation is of a simple distillation and batchwise. Thus, continuous operation can not be carried out.

Whereas, the inventors have found that the crystallization step, as specified, above can be carried out by using a distillation column. This is not in accordance with the conventional knowledge of the field.

In this connection, it is to be noted that when the crystallization is carried out by using a distillation column, if a material solution to be subjected to distillation-crystallization has a Zn concentration of 10 wt % (hereinafter, the percentage represents a percent by weight) or more, the solid concentration in the product slurry becomes 20% or more. Since the volatility of ammonia is high and the evaporation amount of ammonia is large at upper plates of the distillation column, due to the evaporation characteristics of ammonia, zinc carbonate is violently crystallized at that portion. As a result, there occurs heavy sticking of the crystals to the walls or plates inside the distillation column, and bubble-cap portions or the like become clogged, which necessitates stopping of the operation and washing thereof, for example, only after an operation of one day or so.

For example, sticking of crystals X occurs as shown in FIG. 10 in the case of a sieve-tray column, and as shown in FIG. 11 in the case of a bubble-cap tower.

The inventors have attempted to prevent sticking of the crystals by changing the materials or configuration of the distillation column, but they have found that these measures will not be an essential solution for prevention of the crystal sticking. The inventors have further found, in their further study of prevention of the crystal sticking, that the sticking of crystals occurs, in crystallization by the distillation column, when the concentration of the starting solution is high. Based upon this finding, it was concluded that it is effective to prevent the sticking of crystals to provide a plurality of crystallizers before the distillation column so as to partiallY effect the crystallization operation by these crystallizers for lowering the concentration of the feed solution.

However, the general distillation operation in the distillation column is such that distillation is effected at each plate or tray where the material solution comming down therethrough is brought into contact with vapor. In such an operation, the amount of the solution retained by each of the plates or trays is rather small, and if crystallization occurs in such an amount of solution, sticking of the crystals to the plates or trays can not be avoided.

On the other hand, an indirect-type heating means using steam as a heating source is generally employed for carrying out a distillation operation. In this case, however, the heating means becomes inoperative, for example, only after an one-hour operation, because of the sticking of the resultant crystals to the heating faces. As a countermeasure against this, two sets of heating means may be provided so that washing liquid is introduced into one of the heating means for removing the sticking crystals, while the other is in operation. This measure, however, requires too much trouble to continuously operate the distillation system.

In the case where the crystallization is carried out only by the crystallizers, the obtained crystals are of a poor quality having a low bulk specific gravity and a tree-like crystal structure with whiskers (observed by electron microscope). Further, the resultant crystals have a high Cl ion content which is not desirable for some uses. In addition, the resultant crystals have a large surface area and contain a large amount of surface water due to the crystal structure as described above, so that the efficiency of filtration and washing of the succeeding process is not good.

OJECTS OF THE INVENTION

It is an object of the present invention to provide a process for distillation-crystallization of a zinc carbonate which is capable of reducing the number of crystallizers required for the crystallization of the zinc carbonate and capable of carrying out a continuous operation.

It is another object of the present invention to provide a process for distillation-crystallization of a zinc carbonate which is capable of preventing sticking of crystals to a distillation column, especially, to plates or trays thereof, allowing stable operation of the distillation column.

It is a further object of the present invention to provide a process for distillation-crystallization of a zinc carbonate which is capable of obtaining an excellent crystal property.

It is a still further object of the present invention to provide a method for distillation-crystallization of a zinc carbonate which is capable of recovering a useful zinc carbonate from waste zinc.

SUMMARY OF THE INVENTION

In accordance with the present invention, there is provided a process for distillation-crystallization of a zinc carbonate which is characterized in that a distillation column having a plurality of plates or trays is used for crystallizing a basic zinc carbonate ($2ZnCO_3.3Zn(OH)_2$ or $ZnCO_3.3Zn(OH)_2.H_2O$) from a solution of a basic zinc ammonium carbonate ($Zn(NH_3)_4)CO_3$); said solution is fed to an upper portion of the distillation column, while a bottom portion of the distillation column is heated, to effect a distillation operation.

In this process, the distillation and crystallization are carried out by using a distillation column, so that continuous operation is possible. In the case where crystallizers are employed in combination with the distillation column and they are disposed before the distillation column, the number of crystallizers to be installed is greatly reduced, for example reduced to three to five, as compared with the conventional crystallization process by crystallizers.

When a bubble-cap tower is used in the present process, as in the ordinary distillation, it is quite difficult to avoid the sticking of crystals. Whereas, if the bubble-caps are replaced by sieve trays or slit plates, the sticking of crystals can be satisfactorily prevented by suitably selecting the size of the slits or openings. Thus, a stable continuous operation can be ensured.

In this connection, it is recommended to retain the solution/slurry on the respective trays or plates for wetting the same. Otherwise, there might occur the sticking of crystals. To keep that wetting state, the feeding amount of the material solution is suitably selected so that the solution or slurry may be present on the respective trays or plates. More preferably, the distillation column is substantially fully filled with the solution/slurry during the distillation-crystallization. Under this condition, if the lower portion of the column is heated so as to effect a distillation operation, the vapor generated by the distillation goes upwardly within the column through the solution/slurry. At this time, the solution/slurry is effectively agitated and dispersed by the ascending vapor, so that the crystals, which are being precipitated on the trays or plates, are dispersed and the sticking of the crystals can be prevented. Besides, since every space between each of the trays or plates is filled with the liquid, each tray or plate retains large amounts of liquid thereon and the crystallization is effected in this large amount of liquid, so that the sticking of the crystals can be more effectively prevented.

In addition, in the crystallization, it is necessary, to allow growing of the crystal particles so that the crystal particles can be suspended in a solution of super-saturated concentration of metastable state. The crystallization amount per 1 $m^3$ of the solution of super-saturated concentration is determined and the degree of super-saturated concentration is equilibrated, by the concentration of the slurry containing the crystal particles. As the volume of the crystal slurry is increased, the growth of the crystals is effected in a solution of a lower degree of super-saturated concentration and the sticking of the crystals to the walls etc. of the distillation column is reduced. Although the degree of super-saturated concentration is varied depending upon the properties of the substances, if it is lower than a certain value, the sticking and growing of the crystals to and on the distillation column is remarkably reduced and continuous operation is possible. In this respect, it is preferred and advantageous to fill up the distillation column with the solution/slurry to lower the degree of super-saturated concentration. It is further advantageous to let the vapor generated by the distillation in the distillation column agitate the solution/slurry so as to prevent local variation of the concentration and dispel the crystals liable to stick to the through-holes of the sieve-trays or the perforated plates so as to prevent clogging of the holes.

However, if sieve trays, slit plates or perforated plates are used as the trays or plates of the distillation column and the diameter of each of the openings are selected to be 8 to 20 mm (the width of the opening is within this range and the length thereof may be 20 mm or more in the case of slit plates), the sticking of the crystals can be sufficiently prevented even when the the entire space of the column is not filled with the solution/slurry as described above.

In a further preferred mode of the present invention, live steam is directly fed into a bottom portion of the distillation column instead of indirect heating. As a result, the inner face of a blow pipe is always kept free from crystals sticking thereto because of the live steam flows so stable continuous operation is assured. Furthermore, the slurry at the bottom portion of the column is fluidized by the blowing of the live steam so the sticking of the crystals to the inner walls of the column is prevented, and as the live steam blown into the column generates bubbles which ascend together with $NH_3$ and $CO_2$ generated according to formula (3B) or heating based on formula (3B) and vigorously pass through the openings of the plates or trays, the openings and the portions adjacent thereto are washed by the bubbles and the sticking of the crystals can be prevented.

According to the present invention, there is further provided a process for distillation-crystallization of a zinc carbonate which is characterized in that one or more crystallizers are employed in combination with a distillation column for crystallizing a basic zinc carbonate ($2ZnCO_3.3Zn(OH)_2$ or $ZnCO_3.3Zn(OH)_2.H_2O$) from a solution of a basic zinc ammonium carbonate (($Zn(NH_3)_4)CO_3$); the solution is fed to the crystallizer or crystallizers so as to effect a certain degree of crystallization; then the resultant slurry containing crystals is fed to the distillation column so as to effect final crystallization; and vapor generated by heat applied to a bottom portion of the distillation column is fed, through a top portion of the column, to the preceding crystallizer or crystallizers sequentially, thereby allowing the vapor to flow to the first crystallizer countercurrently with respect to the flow of the solution to the final distillation column.

In the case where the desired crystallization is carried out only by the distillation column, the resultant crystals are liable to stick to the inside of the column. By this reason, one or more crystallizers are provided before the distillation column so as to effect a certain degree of crystallization by it or them and to supply to the distillation column a solution of a lower Zn concentration. In this case, the sticking of the crystals to the inside of the column can be substantially suppressed.

By the countercurrent contact of the solution with the vapor generated in the distillation column, continuous distillation operation with a high crystallization efficiency is assured.

According to the present invention, there is further provided a process for distillation-crystallization of a basic zinc carbonate ($2ZnCO_3.3Zn(OH)_2$ or $ZnCO_3.3Zn(OH)_2.H_2O$) from a solution of a basic zinc ammonium carbonate ($Zn(NH_3)_4)CO_3$ which is characterized in that the solution is fed to a partial crystallizer to effect partial crystallization and to remove some of the resultant crystals; the solution is then fed to a main crystallization system comprising one or more crystallizers and a distillation column having a plurality of plates or trays to effect main crystallization; and a portion of the vapor generated in the course of the crystallization is blown into the partial crystallizer.

In this mode of the invention, partial crystallization is carried out by the partial crystallizer provided at the beginning of the crystallization process, so that the main crystallization is carried out after the crystals containing considerable impurities have been removed. Therefore, product crystals of excellent quality can be obtained.

Further, since not all but a part of ammonia and steam generated during the main crystallization is blown into the partial crystallizer, the amount of partial crystallization is not so large and economical operation can be attained.

In accordance with the present invention, there is further provided a process for distillation-crystallization of a zinc carbonate which is characterized in that one or more crystallizers are employed in combination with a distillation column for crystallizing a basic zinc carbonate ($2ZnCO_3.3Zn(OH)_2$ or $ZnCO_3.3Zn(OH)_2.H_2O$) from a solution of a basic zinc ammonium carbonate (($Zn(NH_3)_4)CO_3$); the solution is fed to the crystallizer or crystallizers so as to effect a certain degree of crystallization; then the resultant slurry containing crystals is fed to the distillation column so as to effect final crystallization; and a part of the resultant slurry formed by the crystallization operation in the distillation column is returned to the crystallizer or crystallizers.

A first characteristic feature of this mode of the invention lies in that the slurry, having an ammonia content of 1500 ppm or less, generally 500ppm or less, which is drawn out from the later stage of the crystallization is returned to the earlier stage of the crystallization. The inventors have incidentally found that this operation is effective to obtain crystals of excellent quality. The reason why such excellent crystals are obtained is not clear, but it is presumed that the crystals in the slurry drawn out from the later stage of the crystallization act as seed crystals to allow desired crystal growing from the very start of the crystal growth. In this connection, it is to be noted that it has been common knowledge in the field to return the crystals which have grown gradually as they were of no use or disadvantageous.

A second characteristic feature of this mode of the invention lies in the treatment of ammonia generated during the crystallization process. More particularly, if a large amount of ammonia is contained in the slurry of crystals, it will cause problems in the succeeding waste liquid treatment or necessitate odor control measures. The crystallization by the distillation column solves these problems.

A third characteristic feature of this mode of the invention lies in that the crystallizer or crystallizers are provided before the distillation column so as to avoid the sticking of the crystals to upper portions of the distillation column which prevents smooth crystallization operation.

DESCRIPTION OF THE PREFERRED EMBODIMENT

Figure 1:
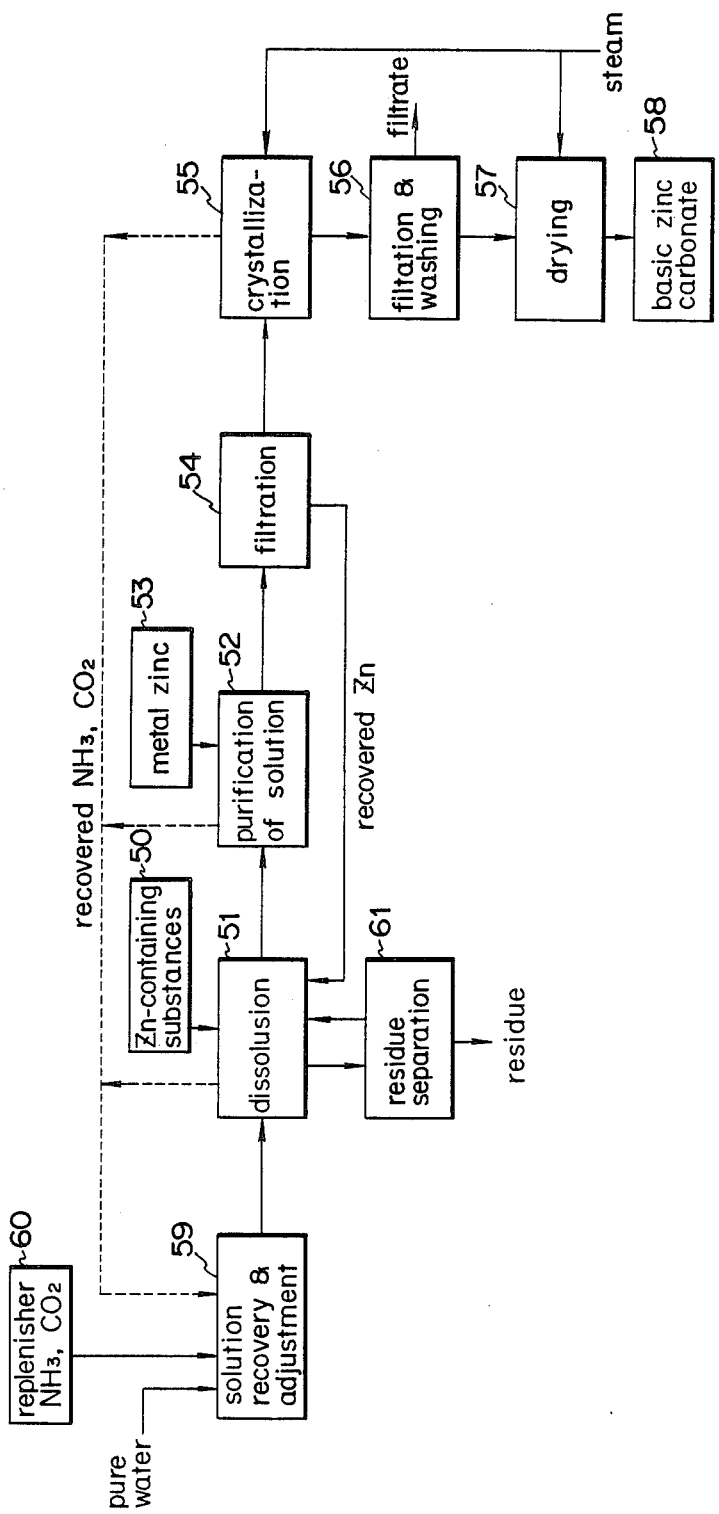
FIG. 1 is a block diagram showing the entire process for preparation of a zinc carbonate.

The invention will now be described in detail, referring to the drawings.

FIG. 1 is a flowchart showing an example of a system for recovering zinc carbonate from zinc-containing substances discharged from a zinc-plating plant such as in an steel mill or the like. The entire process of the system will be first described referring to FIG. 1.

A Zn-containing substance 50 to be treated is dissolved in an aqueous solution of $NH_4OH$ and $(NH_4)_2CO_3$. More particularly, the Zn-containing substance 50 is fed into a final dissolving tank of, for example, three dissolving tanks 51 and the Zn-containing substance 50 contacts countercurrently the solution so as to be dissolved therein. The resultant solution is introduced, for example, into three ion-exchanging tank and one or more settle-separator tanks through a settle-separator tank to effect purification 52 of the solution.

Metal zinc powder 53 is added to the third ion-exchanging tank for ion exchange.

The solution after being subjected to the ion-exchanging step is introduced to a crystallization step 55 of the present invention through a filtration step 54. The crystallization system comprises four crystallizers 1A to 1D and a distilling column 2. The resultant slurry obtained by the crystallization step is then supplied to a filter 56 and dried by a drier 57 so as to become a product 58.

On the other hand, vapor generated by the distillation column 2 and comprising $CO_2$ gas, ammonia gas, and steam is introduced from the first crystallizer 1A to a solution adjusting equipment 59, where $CO_2$ gas and ammonia 60 are added to adjust the concentration thereof to a required level and the so adjusted solution is returned to the dissolving tanks. Undissolved residues in the dissolving and ion-exchanging operations are discharged out of the system through a residue dissolving tank and a filter 61.

The invention which is applicable to the flowchart of FIG. 1 will be described referring to FIG. 2.

The solution feed 3 treated by the dissolution and ion-exchange according to formulae (1) and (2) and precise filtration is introduced into the first crystallizer 1A through a feeding pipe 8A. Each of the crystallizers 1A to 1D has a same structure and comprises a draft tube 4, a stirrer 5 and a cracker pipe 6 provided therein.

The first crystallizer 1A to the final crystallizer 1D are so arranged that the solution resulting after the crystallization by the heat of live steam 7, which is directly blown into the distillation column 2, is supplied to the preceding crystallizers sequentially through feeding pipes 8B to 8D, respectively. A solution having a Zn-concentration of as low as about 2 to 3% is drawn out the bottom of the final, i.e., the fourth crystallizer 1D by a pump 9 and fed to the top of the distillation column 2 through a feeding pipe 8E.

The distillation column 2 has, for example, 20 sieve-trays 2a, 2a, ..., 2a. Live steam is directly fed into the bottom portion of the column. 10 is a stirrer.

The reactions (3A) and (3B) also occur within the distillation column to effect crystallization, and a desired basic zinc carbonate slurry is drawn out of the bottom of the column by a slurry pump 11 and further fed to a succeeding filtration and drying step. The vapor generated in the distillation column 2 ascends within the column and is introduced from the top of the column to the cracker pipe 6 of the final, fourth crystallizer 1D through a vapor feeding pipe 12A. The vapor is then used as a heat source for the crystallization in the crystallizer 1D.

In turn, the vapor generated in the fourth crystallizer 1D is introduced into the third crystallizer 1C through a vapor feeding pipe 12B. Thus, the vapor generated in the respective crystallizers is fed to the respectively preceding crystallizers through vapor feeding pipes 12C and 12D. The vapor generated in the first crystallizer 1A is fed to the solution adjusting step.

As described above, the solution feed and the generated vapor contact each other countercurrently.

Although four crystallizers are provided in the embodiment as described above, the number of the crystallizers is not limited thereto and one will suffice as the case may be and two or three, or more than four crystallizers may be provided. Or, a crystallizer may be omitted when the solution to be treated has sufficiently low concentration. In any case, it is preferred that the Zn-concentration of the solution to be fed from the final crystallizer to the distillation column 2 be 1 to 5%, especially 2 to 3.5%. Therefore, the Zn-concentration (generally 10%) of the starting solution is to be lowered by the crystallization operation in the crystallizer or crystallizers. The crystallization rate of the respective crystallizers is preferably 30 to 100 kg/m$^3$ hr. In the case where four crystallizers are provided, the ammonia concentrations of the fourth to the first crystallizers are 3%, 4%, 6% and 8%, respectively.

Figure 3:
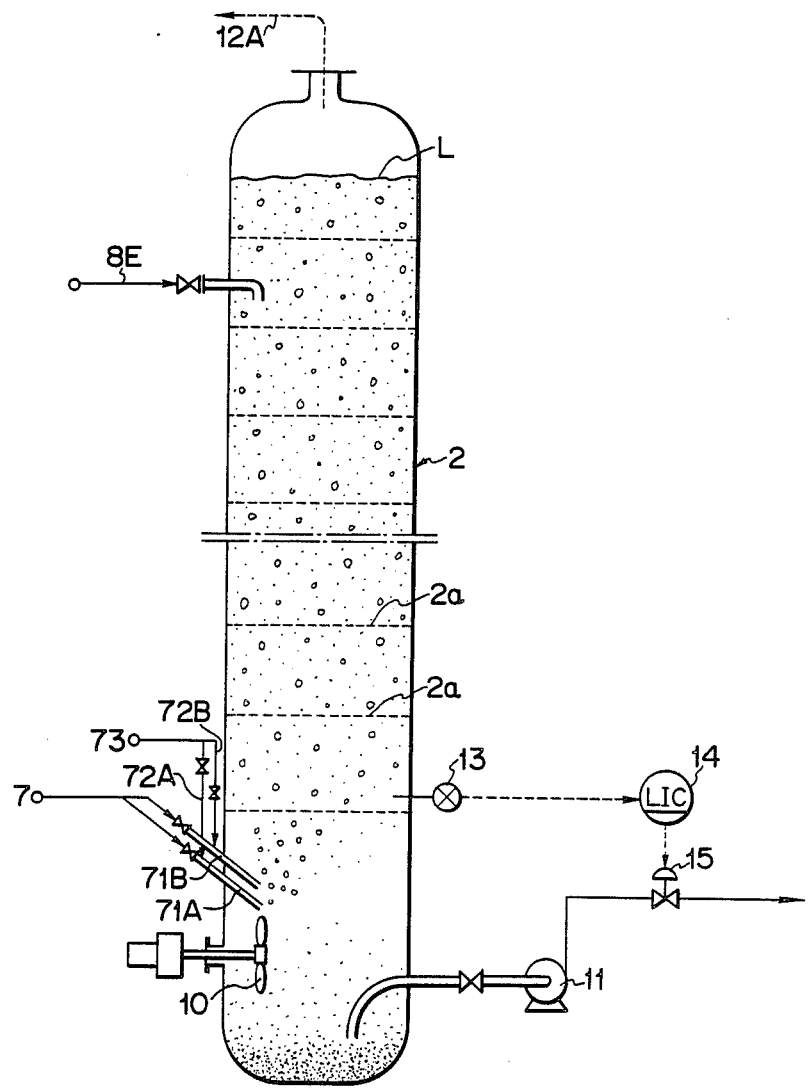
FIG. 3 is a schematic view of a distillation column in the crystallization process.

Referring now to FIG. 3 which illustrates a preferred mode of the present invention, the feeding amount of the basic zinc ammonium carbonate to the distillation column 2 and the drawing amount of the slurry from the bottom of the column are controlled to fill the column with the solution/slurry so as to position the level of the solution/slurry in the column to above the uppermost tray or plate. For this purpose, a level meter 13 capable of covering the entire height of the column is provided and a slurry discharging control valve 15 is controlled by a level controller 14.

In this state, when live steam is blown into the column, the steam produces bubbles and the bubbles move upwardly. In addition, $NH_3$ gas and $CO_2$ gas generated by the heat of the live steam 7 also produce bubbles and these bubbles also move upwardly. All the bubbles are combined with each other or are further divided into more fine bubbles while they are passing upwardly through the openings of the trays or plates and they are dispersed into the solution/slurry. As a result, the solution/slurry is stirred and agitated by the bubbles and the crystal particles are dispersed thereby. Therefore, the crystal particles are prevented from sticking to the trays or plates, the openings of the trays or plates, or the inner walls of the column. Thus, the sticking of the crystals can be prevented.

In this connection, it is to be noted that although the heating is effected by the direct blowing of the live steam in the foregoing embodiments, the $NH_3$ gas and $CO_2$ gas generated will produce bubbles and a similar effect can be obtained in the case where an indirect heating system is employed However, in the case of indirect heating, sticking of crystals to the heating surface occurs and the amount of bubbles is not sufficient so that a desired agitation effect can not always be obtained. In this respect, the direct blowing of the live steam is preferred.

Instead of steam, another heating gas which is inactive with the solution may be employed.

The manner of blowing the live steam is preferably carried out in such a manner as illustrated in FIG. 3, wherein a plurality of, for example, two steam blowers 71A and 71B are connected to aqueous ammonia supplying pipes 72A and 72B, respectively and aqueous ammonia 73 is supplied into one of the steam blowers, while the other is in operation, through an aqueous ammonia supplying pipe for a long period of time, to dissolve and remove the crystals of zinc carbonate sticking to the spout of the blower. After completion of this operation, the aqueous ammonia supply is changed to the steam blowing, while the other is changed into a similar washing operation.

Figure 4:
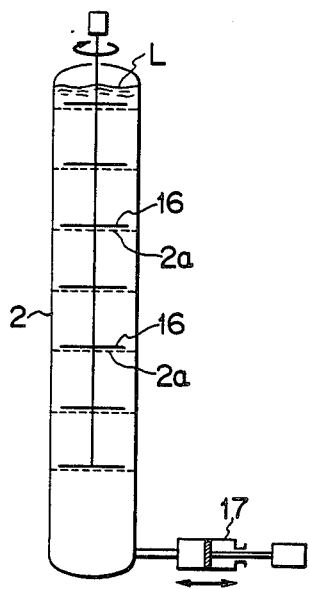
FIG. 4 is a schematic view of a distillation column having means for preventing sticking of crystals.
Figure 5:
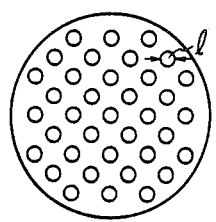
FIG. 5 is a plan view of one form of a tray or plate.

When it is required to further prevent sticking of the crystals, a scraper means having a blade 16 for scraping crystals off the trays or plates may be provided as shown in FIG. 4, or a pulsating pump 17 of, for example, piston type for providing pulsation to the solution/slurry in the distillation column may be provided as also shown in FIG. 4. In the latter case, the solution/slurry is sucked and injected alternatingly by the pump 17 to pulsate the solution/slurry.

Figure 6:
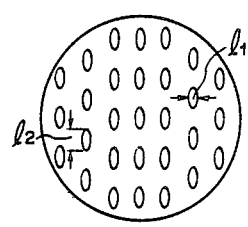
FIG. 6 is a plan view of another form of a tray or plate.
Figure 10:
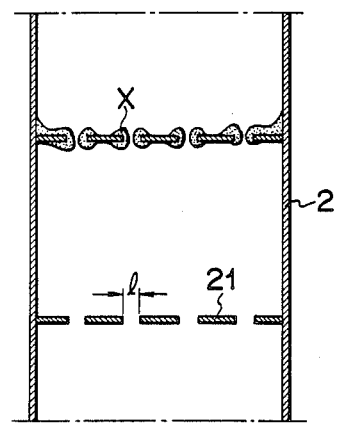
FIG. 10 is a sectional view showing the sticking of crystals to a sieve tray.
Figure 11:
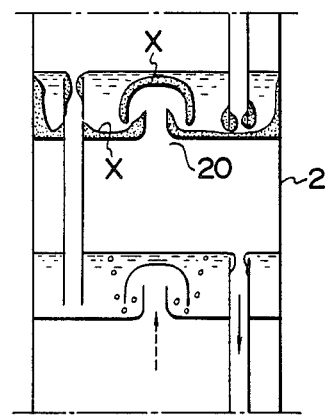
FIG. 11 is a similar sectional view showing the sticking of crystals in a bubble-cap tower.

As a tray or plate suitable for the present invention, there may be mentioned a sieve tray 21 as shown in FIGS. 3 and 10 or a slit plate 22 as shown in FIG. 6 or another type of perforated plate, which are preferred, in the prevention of crystal sticking, to a bubble-cap tray which is generally used in a distillation column. The diameter of the slit 1, 11 of the perforated plate is preferably 8 to 20 mm. If the diameter is less than 8 mm, there is a possibility of crystal sticking. If the diameter exceeds 20 mm, the crystal sticking is prevented, but desired dispersion of bubbles is not attained and the sticking of crystals may occur on the inner walls etc. of the column. The length 12 of the slit may exceed 20 mm, but it is preferably 100 mm or less.

Figure 7:
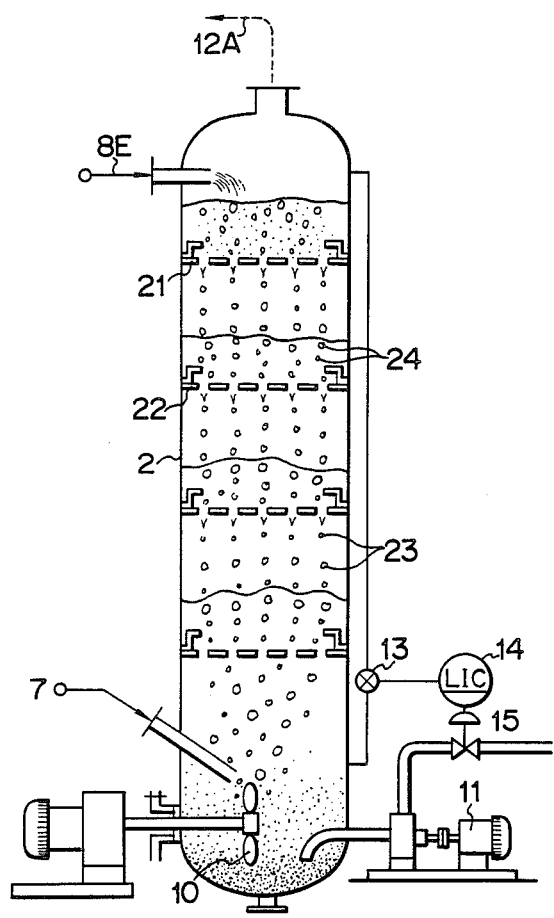
FIG. 7 is a schematic view of a distillation column showing a modified operation method with respect to a feed solution level.

FIG. 7 illustrates another mode of operation according to the present invention wherein the solution/slurry does not fill up the distillation column, but the amounts of the solution/slurry retained on the respective trays or plates are controlled to prevent sticking of the crystals. 23 is a drop of the solution/slurry and 24 is a bubble. It may be presumed that when the sieve trays or perforated plates are used, the bubbles vigorously pass upwardly through the openings of the trays or plates, so that the openings are always washed by the bubbles and sticking of the crystals is prevented. Further, when the bubbles enter into the solution/slurry, the solution/slurry is agitated and the trays or plates are shaken. This is further effective to remove the crystals which start growing on the trays or plates, or the inner walls of the column.

In the foregoing embodiments wherein four crystallizers are used in combination with the distillation column to carry out the crystallization, if the ammonia concentration at the inlet of the first crystallizer is, for example, 11%, the ammonia concentrations of the first crystallizer to the fourth crystallizer are 8%, 6%, 4% and 3%, respectively, and if the Zn solubility at the inlet is 11%, the solubilities of Zn in the respective crystallizers are 8%, 6%, 4% and 3%, respectively. About 30% of the total crystallization amount is attained in the first crystallizer.

As described above, the crystals produced at the early stage of the crystallization step have a larger impurity content. Therefore, it is advantageous to effect partial crystallization as disclosed in Japanese Patent Laid-Open No. 59-88319 to obtain final crystals of less impurity content. The crystals obtained by the partial crystallization are returned to the dissolving step provided at the beginning of the process and then subjected to ion exchange. For example, if 30% of the crystallization is attained in the first crystallizer, in order to obtain 100 kg of the product crystals, a solution containing 143 kg of crystal equivalent is supplied to the crystallization step to effect partial crystallization of 43 kg (143×0.3) and the resultant crystals are returned to the dissolving step. In this case, however, the return amount is so large that the operation costs much and the scale of the plant should be rather large.

In this connection, there is desired a method for crystallizing zinc carbonate which is capable of attaining an economical operation and yet assuring the quality of the product crystals which have extremely low impurity content.

Figure 8:
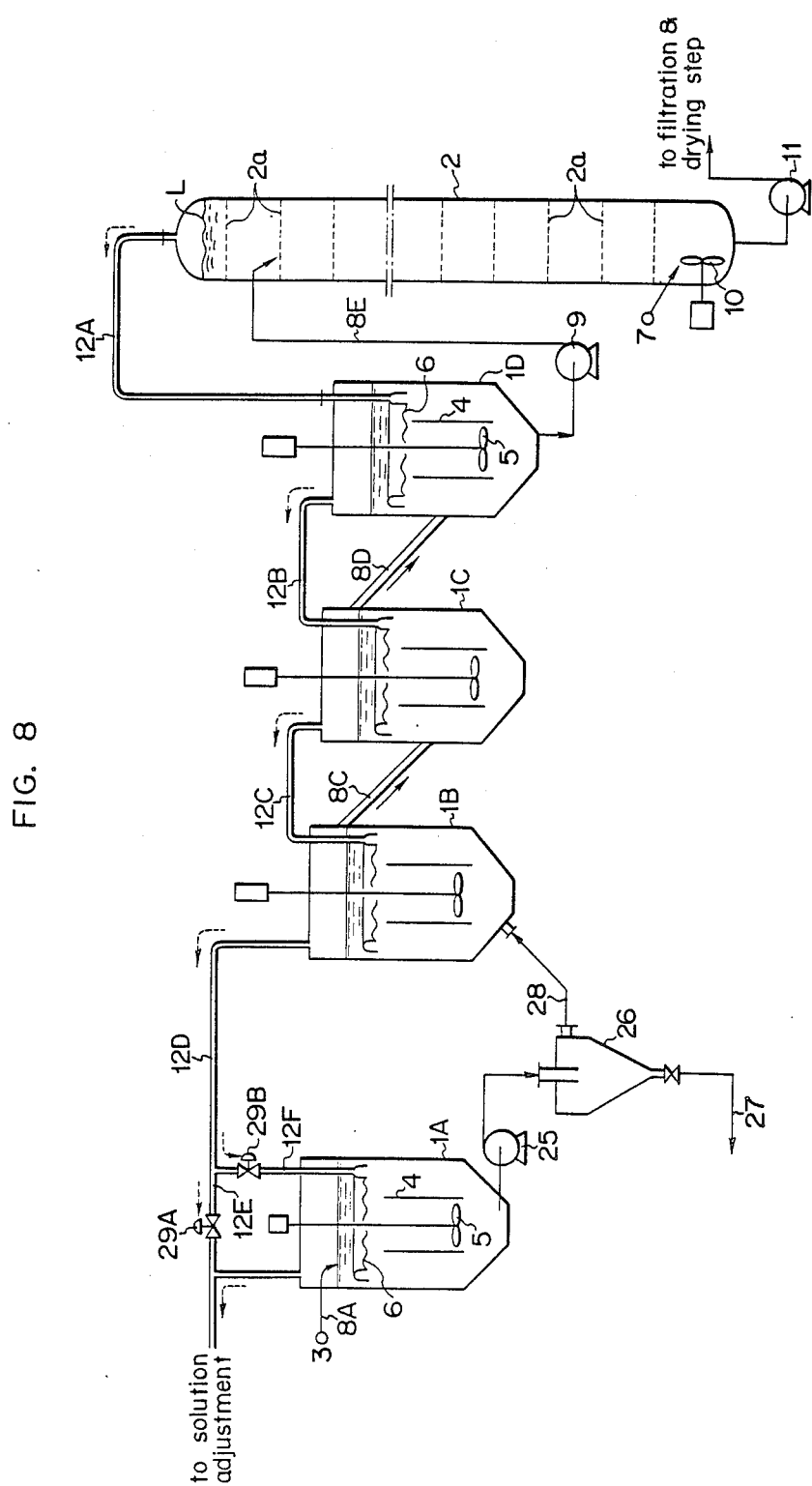
FIG. 8 is a schematic view of another mode of the present invention.

The present invention, therefore, provides such a process as illustrated in FIG. 8.

The starting solution 3 treated by the dissolution and ion-exchange according to formulae (1) and (2) and precise filtration is introduced into the partial crystallizer 1A through a feeding pipe 8A. Thereafter, the solution 3 is fed sequentially from the second crystallizer 1B to the fourth crystallizer 1D, which constitute a main crystallizing system, through a solid separator 26. Each of the crystallizers 1A to 1D has the same structure and comprises a draft tube 4, a stirrer 5 and a cracker pipe 6 provided therein.

The solution drawn out from the bottom of the partial crystallizer 1A by a pump 25 is separated, in the solid separator 26, into a crystal portion and a solution portion. The crystal portion drawn out from the bottom is returned to the dissolving step and the solution portion 28 is introduced into the second crystallizer 1B. The solutions of the second and the third crystallizers are sequentially fed into the respectively succeeding crystallizers through the feeding pipes 8C, 8D, respectively.

A solution having a Zn-concentration of as low as about 2 to 3% is drawn out from the bottom of the fourth, i.e., the final crystallizer 1D by a pump 9 and fed to the top of the distillation column 2 through a feeding pipe 8E.

The distillation column 2 has, for example, 20 sieve-trays 2a, 2a, ..., 2a. Live steam is directly fed into the bottom portion of the column. 10 is a stirrer.

The reactions (3A) and (3B) also occur within the distillation column to effect the crystallization, and a desired basic zinc carbonate slurry is drawn out of the bottom of the column by a slurry pump 11 and further fed to a succeeding filtration and drying step. The vapor generated in the distillation column 2 ascends within the column and is introduced from the top of the column to the cracker pipe 6 of the final, fourth crystallizer 1D through a vapor feeding pipe 12A. The vapor is then used as a heat source for the crystallization in the crystallizer 1D.

In turn, the vapor generated in the fourth crystallizer 1D is introduced into the third crystallizer 1C through a vapor feeding pipe 12B. Thus, the vapor generated in the respective crystallizers is fed to the respective preceding crystallizers through vapor feeding pipes 12C and 12D. The vapor generated in the first crystallizer 1A is fed to the solution adjusting step.

In this mode of the invention, the possibility that the crystallization amount of the first crystallizer 1A becomes too large is avoided. If all of the ammonia/steam from the second crystallizer is fed to the first crystallizer, about 30% of the crystallization occurs at the first crystallizer. Whereas, it is desirable to suppress the crystallization amount to about 10%. Therefore, for example, 112.4 kg of the ammonia/steam is fed to the partial crystallizer and about 10% of the amount, i.e., 11.2 kg of the ammonia/steam is returned to the dissolving step.

To attain this, the ammonia/steam blowing amount to the partial crystallizer 1A is selected to be ⅓ and the remaining ⅔ is by-passed. For this purpose, a by-pass pipe 12E is provided and flow control valves 29A, 29B are provided at the by-pass 12E and a blow pipe 12F, respectively, so as to control the blowing amount to the partial crystallizer 1A.

Figure 9:
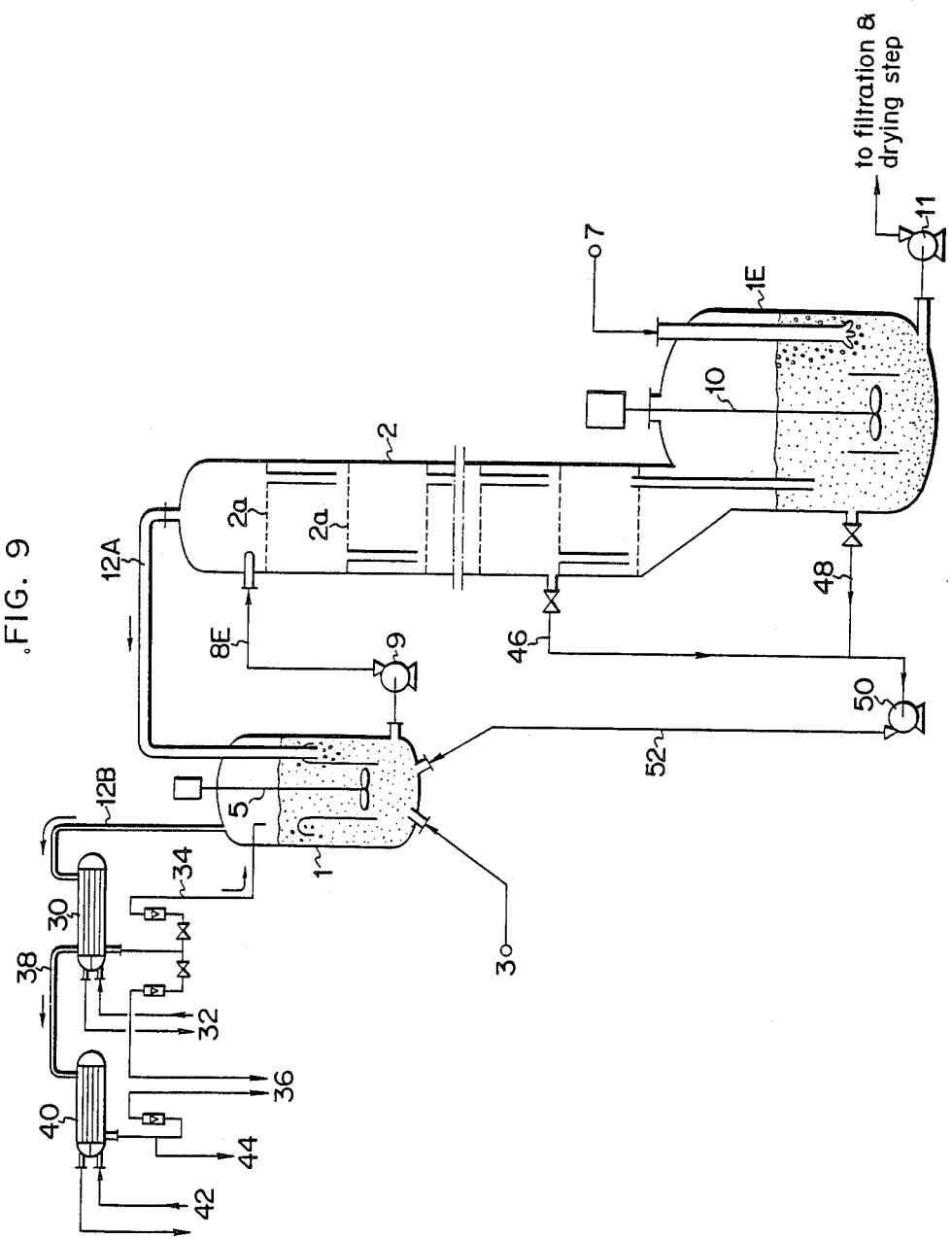
FIG. 9 is a similar schematic view of a still another mode of the present invention.

FIG. 9 illustrates a further mode of the present invention wherein a portion of the slurry obtained by the crystallization in the distillation column 2 is returned to a crystallizer 1. Same or similar parts or portions as in those of the foregoing embodiments are denoted by the same or similar numerals or characters and the description thereof is omitted here. Although a single crystallizer is provided in the embodiment as illustrated, a plurality of crystallizers may be employed.

Heating steam 7 blown into a final crystallizer 1E passes sequentially through the final crystallizer 1E and a distillation 2 having a plurality of trays or plates and is used as a heat source for the crystallization. The steam 7 is then fed from the top of the column 2 to the preliminary crystallizer 1 through a pipe 12A. The vapor moved to the upper portion of the preliminary crystallizer 1 is introduced into a reflux cooler 30 through a pipe 12B and cooled there by cooling water 32 to be condensed into a liquid. The resultant liquid is partly returned to the preliminary crystallizer 1 thorugh a reflux pipe 34 and partly drawn out as a discharge 36 and further partly fed to a condenser 40 through a pipe 38 to be condensed by brine 42 and drawn out as a discharge. 44 is an exit for uncondensed gas. The discharge is an aqueous solution of $NH_4OH$ and $(NH_4)_2CO_3$ and reused for the dissolution of the Zn-containing substance.

Although crystals of some purity can be obtained by the arrangement and operation as described above, in a preferred mode of the present invention, slurry having an ammonia concentration of 1500 ppm or less, preferably 500 ppm or less, is drawn out from a later stage of the crystallization step, for example, a final portion of the distillation column 2 and the final crystallizer 1E, though pipes 46, 48, respectively, so as to further improve the quality of the product crystals. The slurry drawn out is then returned to the preliminary crystallizer 1 by a pump 50 through a return path 52. The quality of the product crystals is by far improved as compared with that of the crystals obtained without the returning operation, as will be apparent from the following Examples.

EXAMPLES

Example 1

Figure 2:
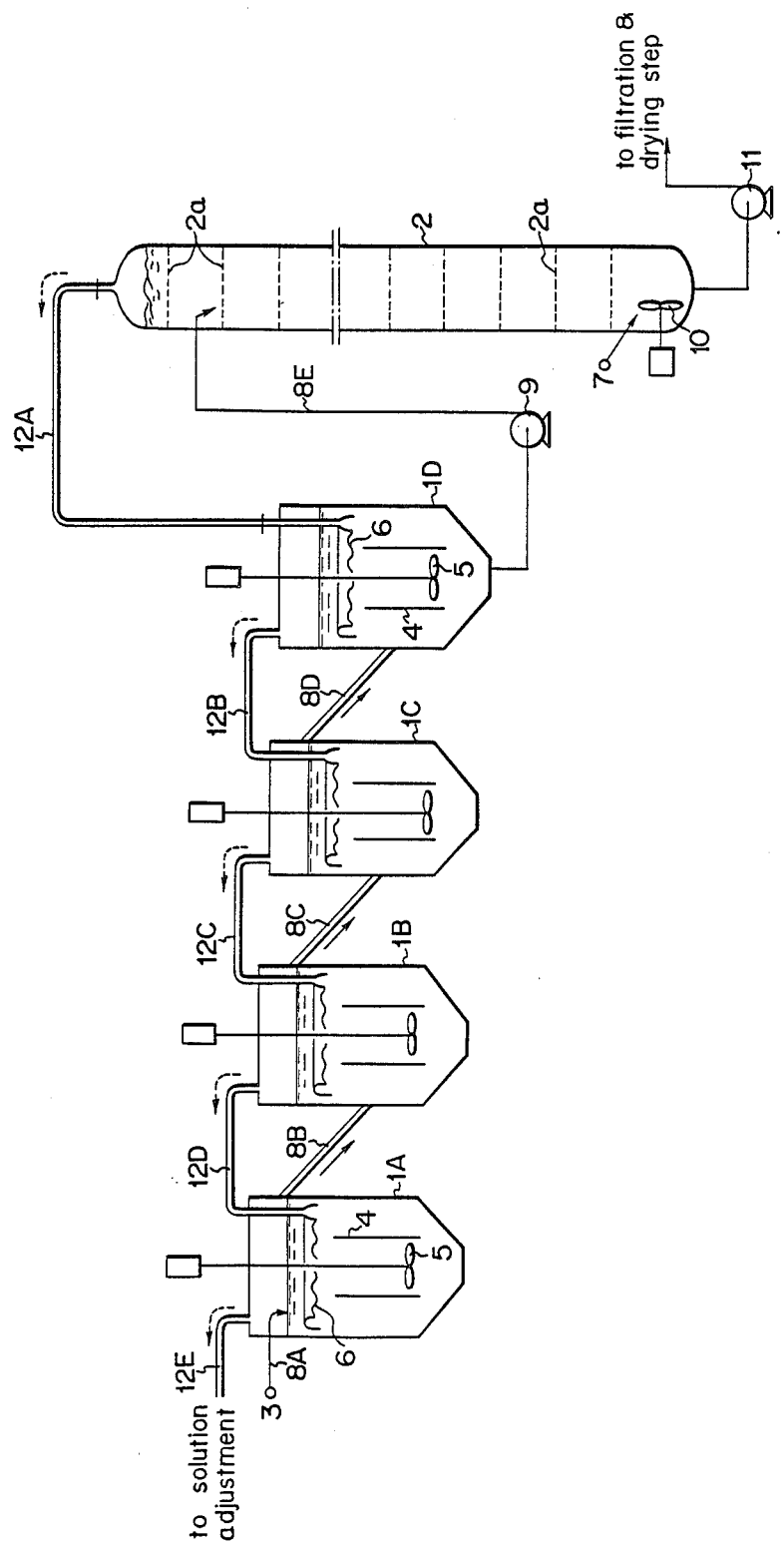
FIG. 2 is a schematic view of one mode of the present invention showing the crystallization process thereof.

A Zn-containing substance obtained from a zinc-plating dust discharged from an iron mill is treated by a process as shown in FIGS. 1 and 2, except that only two crystallizers are employed.

Each of the crystallizers has a liquid volume of 50 l. The distillation column has a size of 200 mm$\phi \times$ 6900 mmH. The distillation column is made of stainless steel coated, on the inner face thereof, with rubber and provided with, inside thereof, 12 sieve trays of stainless steel each having a number of slits of 8×100 mm.

A solution of $Zn(NH_3)_4CO_3$ having a Zn-concentration of 10.2% was fed to the first crystallizer at a rate of 100 l/hr. On the other hand, live steam of 110° C. was directly blown into the bottom portion of the distillation column at a rate of about 60 kg/hr. As a result, the temperatures at the top portions of the first and the second crystallizers and the distillation column were about 80°, 90° and 100° C., respectively. The ammonia concentration at the bottom portions of the respective crystallizers and the distillation column were 200 to 500 ppm.

100 to 120 l/m³ of slurry was obtained from the bottom of the distillation column and the slurry was then subjected to filtration drying. Thus, zinc carbonate of high purity, containing 5 ppm or less of Fe and 1 ppm or less of heavy metals such as Pb was obtained.

Example 2

In an arrangement of a distillation column as illustrated in FIG. 3, live steam was blown continuously at least for two days, and live steam blowing for 6 to 8 hours per day was carried out for a week. No clogging was caused at the blowing pipes. When crystals stuck to the peripheral portions of the pipes grew to an extent that they entered into the spouts of the pipes, a small amount of aqueous ammonia was injected. As a result, the crystals were easily dissolved and removed.

EXAMPLE 3

In an arrangement as illustrated in FIG. 8, the blow ammount of ammonia/steam was controles so as to effect about 10% of the crystallization at a partial crystallizer. The result is shown in Table 1.

TABLE 1

|  | Zn | Fe | Pb | Cd |
|---|---|---|---|---|
| Feed solution | 99 g/l | 1.22 ppm | 0.12 ppm | 0.02 ppm |
| Crystals obtained by partial crystallization | 58.74% | 89 ppm | 8.4 ppm | 0.6 ppm |
| Filtrate after partial crystallization | 90 g/l | 0.17 ppm | 0.04 ppm | 0.016 ppm |
| Crystals obtained by main crystallization | 59.8% | 6.83 ppm | 0.67 ppm | 0.12 ppm |
| Filtrate after main crystallization | 0.25 g/l | 0.1 ppm | 0.01 ppm | 0.01 ppm |

For comparison, the same feed solution was directly supplied to the main crystallization without effecting the partial crystallization. The result is show in Table 2.

TABLE 2

|  | Zn | Fe | Pb | Cd |
|---|---|---|---|---|
| Crystals obtained by main crystallization | 59.3% | 15.3 ppm | 0.95 ppm | 0.18 ppm |
| Filtrate after main crystallization | 0.42 g/l | 0.1 ppm | 0.01 ppm | 0.01 ppm |

As apparent from the results of Tables 1 and 2, the impurity contents, especially the Fe-contents, are remarkably lower and the purity of the product crystals is improved.

EXAMPLE 4

(Conventional Process)

A crystallization operation was carried out by using three crystallizers. The obtained crystals of zinc carbonate were substantially the same as those obtained by the following comparative example, but even after the resultant slurry containing the crystals was filtered and washed and then subjected to centrifugal separation to dehydrate and purify the crystals, the products had an average water content of 40%.

(Comparative Example)

A crystallization operation was carried out in a manner substantially the same as that illustrated in FIG. 9 except that the slurry return procedure was omitted. A solution having an ammonia concentration of 120 g/l and a zinc concentration of 110 g/l was fed to a preliminary crystallizer. The resultant slurry containing crystals was washed and dehydrated to obtain crystals having a $NH_3$ concentration of 3000 ppm and a Cl concentration of 45 ppm. The particle size of the obtained crystals was 10μ, the bulk specific gravity was 0.81 g/cm³ and the water content was 40%.

(Present Invention)

A crystallization operation was carried out by using the system as illustrated in FIG. 9. The ratio by weight of the solution feeding amount and the slurry returning amount was 1:1. The ammonia concentration of a preliminary crystallizer was 3.5 to 7.5%. The final product of crystals obtained after filtration and washing had a $NH_3$ concentration of 12000 ppm and a Cl concentration of 11 ppm. The particle size of the products was 4.5μ, the bulk specific gravity was 1.05 and the water content was 32%.

(Observations)

It can be seen, from the results as described above, that crystals of good quality having a low Cl and $NH_3$ concentration, large particle size and bulk specific gravity, and good hydro-extractability can be obtained using the process of the invention.

We claim:

1. A process for the distillation-crystallization of basic zinc carbonate ($2ZnCO_3.3Zn(OH)_2$ or $ZnCO_3.3Zn(OH)_2.H_2O$) comprising:
    feeding a basic zinc ammonium carbonate ($Zn(NH_3)_4CO_3$) solution to a crystallizer or crystallizers so as to effect a certain degree of crystallization and form a slurry or solution having crystals therein;
    feeding the slurry or solution having crystals therein from a final crystallizer to a distillation column having a plurality of plates or trays so as to effect a final crystallization,
    passing vapor generated by heat applied to a bottom portion of the distillation column through a top portion of the column to a preceding crystallizer or crystallizers sequentially; and
    allowing the vapors to flow to a first crystallizer countercurrently with respect to the flow of the slurry or solution to the distillation column.

2. A process for distillation-crystallization of a zinc carbonate as claimed in claim 1, wherein said plates or trays are sieve- or perforated plates or trays.

3. A process for distillation-crystallization of a zinc carbonate as claimed in claim 2, wherein said sieve- or perforated plates or trays each have a plurality of openings having a diameter or width of 8 to 20 mm.

4. A process for distillation-crystallization of a zinc carbonate as claimed in claim 1, wherein the heating at the bottom portion of the column is attained by direct blowing of heating live steam.

5. A process for distillation-crystallization of a zinc carbonate as claimed in claim 1, wherein the solution fed into the distillation column or the resultant slurry is present at least on each of the plates or trays, wetting the plates or trays, respectively, and under these conditions, vapor generated in the distillation column is allowed to move upwardly.

6. A process for distillation-crystallization of a zinc carbonate as claimed in claim 5, wherein said solution or slurry substantially fills up the distillation column.

7. A process for distillation-crystallization of a basic zinc carbonate as claimed in claim 1, wherein the Zn concentration of the solution or slurry frd from the final crystallizer to the distillation column is 1 to 5 wt %.

8. A process for the distillation-crystallization of basic zinc carbonate ($2ZnCO_3.3Zn(OH)_2$ or $ZnCO_3.3Zn(OH)_2.H_2O$) from basic zinc ammonium carbonate ($Zn(NH_3)_4CO_3$) solution comprising:
    feeding the basic zinc ammonium carbonate solution to a partial crystallizer to e'fect partial crystallization and form a first solution containing crystals therein;
    removing a fractional part of the crystals from said first solution thereby obtaining a second solution containing the remainder of said crystals;
    feeding said second solution to a full crystallization system comprising one or more crystallizers and a distillation column having a plurality of plates or trays in order to effect full crystallization; and
    blowing a portion of a vapor generated in the course of the crystallization into the partial crystallizer.

9. A process for the distillation-crystallization of a basic zinc carbonate ($2ZnCO_3.3Zn(OH)_2$ or $ZnCO_3.3Zn(OH)_2.H_2O$) from a basic zinc ammonium carbonate ($Zn(NH_3)_4CO_3$) solution comprising:
    feeding the basic zinc ammonium carbonate solution to a crystallizer or crystallizers so as to effect a certain degree of crystallization and form a resultant slurry containing crystals;
    feeding the resultant slurry containing crystals to a distillation column so as to effect a final crystallization and form a final resultant slurry; and
    returning a part of the final resultant slurry to the crystallizer or crystallizers.

10. A continuous process for treating an aqueous solution of basic zinc ammonium carbonate $Zn(NH_3)_4CO_3$ to recover crystals of a basic zinc carbonate $2Zn CO_3.3Zn(OH_2)$ or $ZnCO_3.3Zn(OH)_2.H_2O$, which comprises the steps of: feeding said solution into crystallizing means and therein contacting said solution with a heated vapor containing steam, $NH_3$ gas and $CO_2$ whereby to separate a vapor from said solution, to convert said basic zinc ammonium carbonate to said basic zinc carbonate and to form an aqueous composition containing said basic zinc carbonate; feeding said aqueous composition to a plate distillation column having perforated or slotted plates and therein flowing said aqueous composition downwardly and contacting it with an upwardly flowing heated vapor thereby obtaining a bottom product which is an aqueous slurry of said basic zinc carbonate and an overhead product which is a vapor containing $CO_2$ gas, $NH_3$ gas and steam, and using said overhead product as said heated vapor that is supplied to said crystallizing means.

11. A process as claimed in claim 10 in which said aqueous composition fills said distillation column to a level above the uppermost plate therein.

* * * * *